US012738522B2

(12) United States Patent
Kwak et al.

(10) Patent No.: US 12,738,522 B2
(45) Date of Patent: Sep. 15, 2026

(54) HIGH TEMPERATURE POLYMER ELECTROLYTE MEMBRANE FUEL CELL AND METHOD FOR MANUFACTURING SAME

(71) Applicants: Hyundai Motor Company, Seoul (KR); Kia Corporation, Seoul (KR); Research & Business Foundation SUNGKYUNKWAN UNIVERSITY, Suwon-si (KR)

(72) Inventors: Da Hee Kwak, Suwon-si (KR); Won Jae Choi, Seoul (KR); Songi Oh, Suwon-si (KR); Hyoun Myung Park, Incheon (KR); Sung Hee Shin, Incheon (KR); Jee Youn Hwang, Seoul (KR); Ah Hyeon Park, Suwon-si (KR); Kyung Su Kim, Seoul (KR); Ji Yun Kim, Ansan-si (KR); Seong Min Cho, Suwon-si (KR); Chang Sik Song, Seoul (KR)

(73) Assignees: Hyundai Motor Company, Seoul (KR); Kia Corporation, Seoul (KR); Research & Business Foundation SUNGKYUNKWAN UNIVERSITY, Suwon-Si (KR)

( * ) Notice: Subject to any disclaimer, the term of this patent is extended or adjusted under 35 U.S.C. 154(b) by 660 days.

(21) Appl. No.: 18/299,318

(22) Filed: Apr. 12, 2023

(65) Prior Publication Data

US 2024/0186555 A1 Jun. 6, 2024

(30) Foreign Application Priority Data

Nov. 15, 2022 (KR) ........................ 10-2022-0152360

(51) Int. Cl.
*H01M 8/124* (2016.01)
*C08G 61/12* (2006.01)
(Continued)

(52) U.S. Cl.
CPC .......... *H01M 8/124* (2013.01); *C08G 61/122* (2013.01); *H01M 8/103* (2013.01); *H01M 2008/1095* (2013.01); *H01M 2300/0082* (2013.01)

(58) Field of Classification Search
None
See application file for complete search history.

(56) References Cited

U.S. PATENT DOCUMENTS

2023/0369625 A1* 11/2023 Kwak ................ H01M 4/8892

FOREIGN PATENT DOCUMENTS

CN 115763917 * 3/2023

OTHER PUBLICATIONS

Tang et al., "Low Pt Loading for High Performance Fuel Cell Electrodes Enabled by Hydrogen-bonding Microporous Polymer Binders," Nature Communications 13:7577, 1-13, Dec. 2022.*

(Continued)

*Primary Examiner* — Jonathan Crepeau
(74) *Attorney, Agent, or Firm* — Slater Matsil, LLP

(57) ABSTRACT

An embodiment fuel cell including a high temperature polymer electrolyte membrane includes an electrolyte membrane including a phosphoric acid-doped polymer of intrinsic microporosity, a cathode disposed on a first surface of the electrolyte membrane, and an anode disposed on a second surface of the electrolyte membrane, the second surface opposite the first surface.

12 Claims, 4 Drawing Sheets

(51) Int. Cl.
*H01M 8/10* (2016.01)
*H01M 8/103* (2016.01)

(56) References Cited

OTHER PUBLICATIONS

Sun et al., "Phosphonated lonomers of Intrinsic Microporosity with Partially Ordered Structure for High-Temperature Proton Exchange Membrane Fuel Cells," ACS Central Science 2023, 9, 733-741, Mar. 2023.*

* cited by examiner

[FIG. 1]
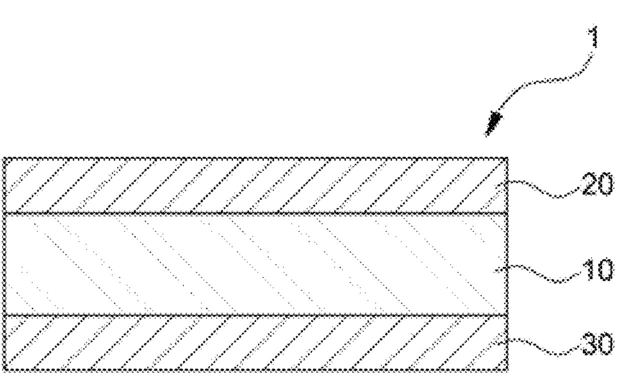
[FIG. 2]
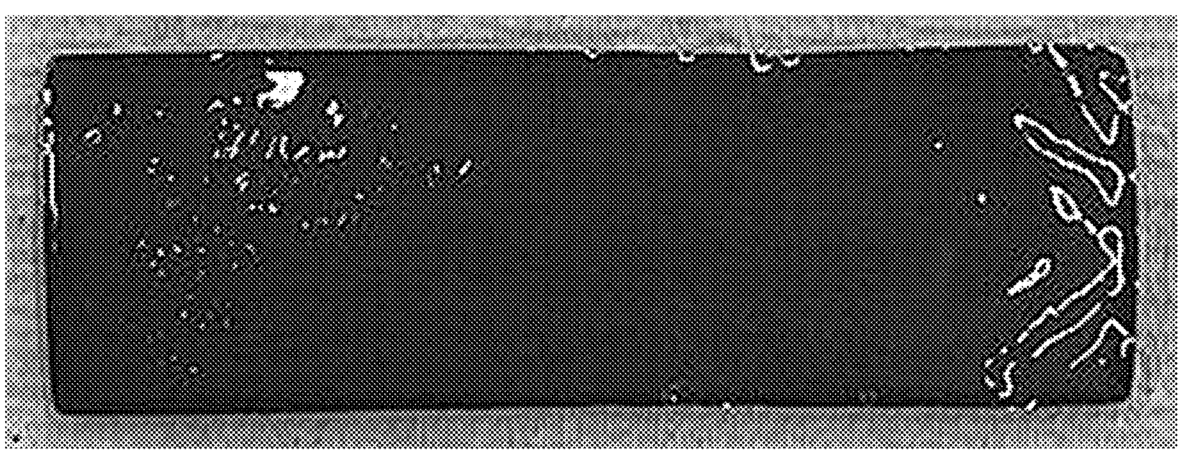

[FIG. 3]
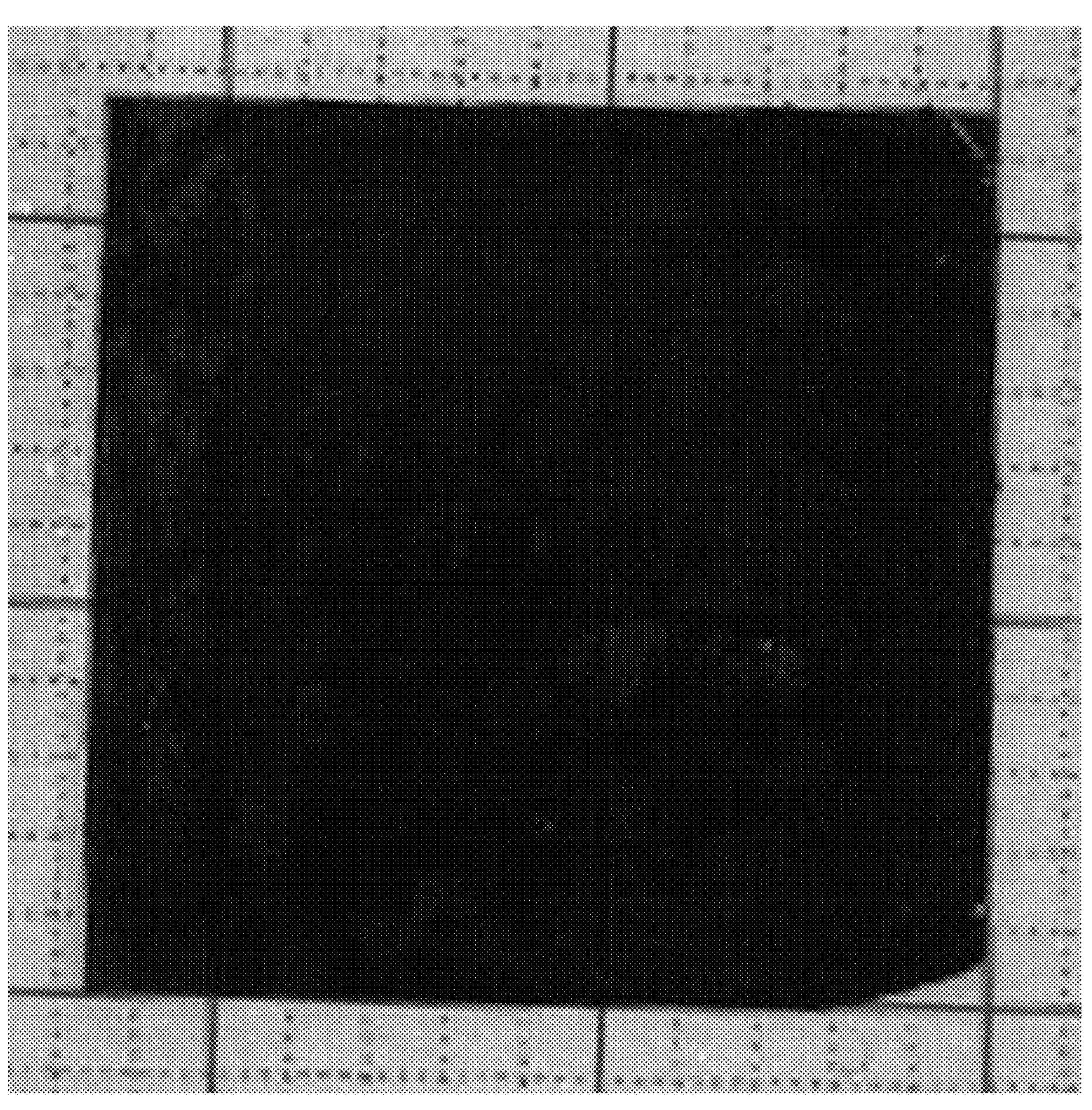

[FIG. 4]
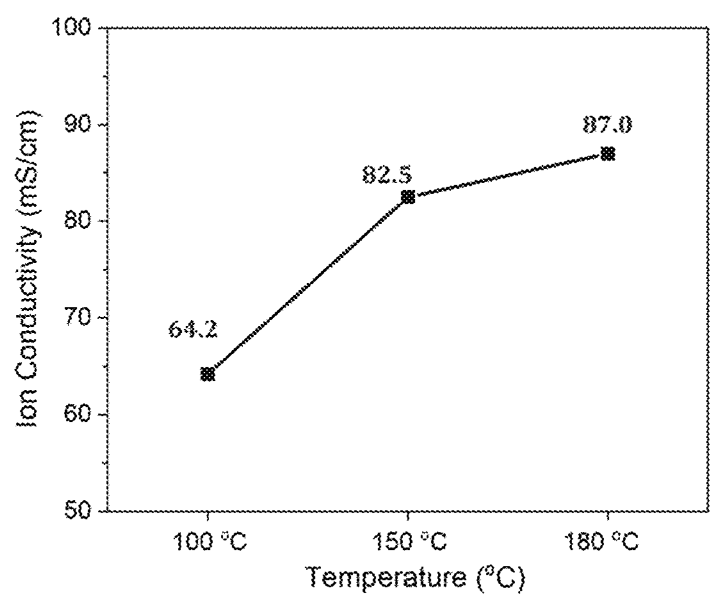

[FIG. 5]
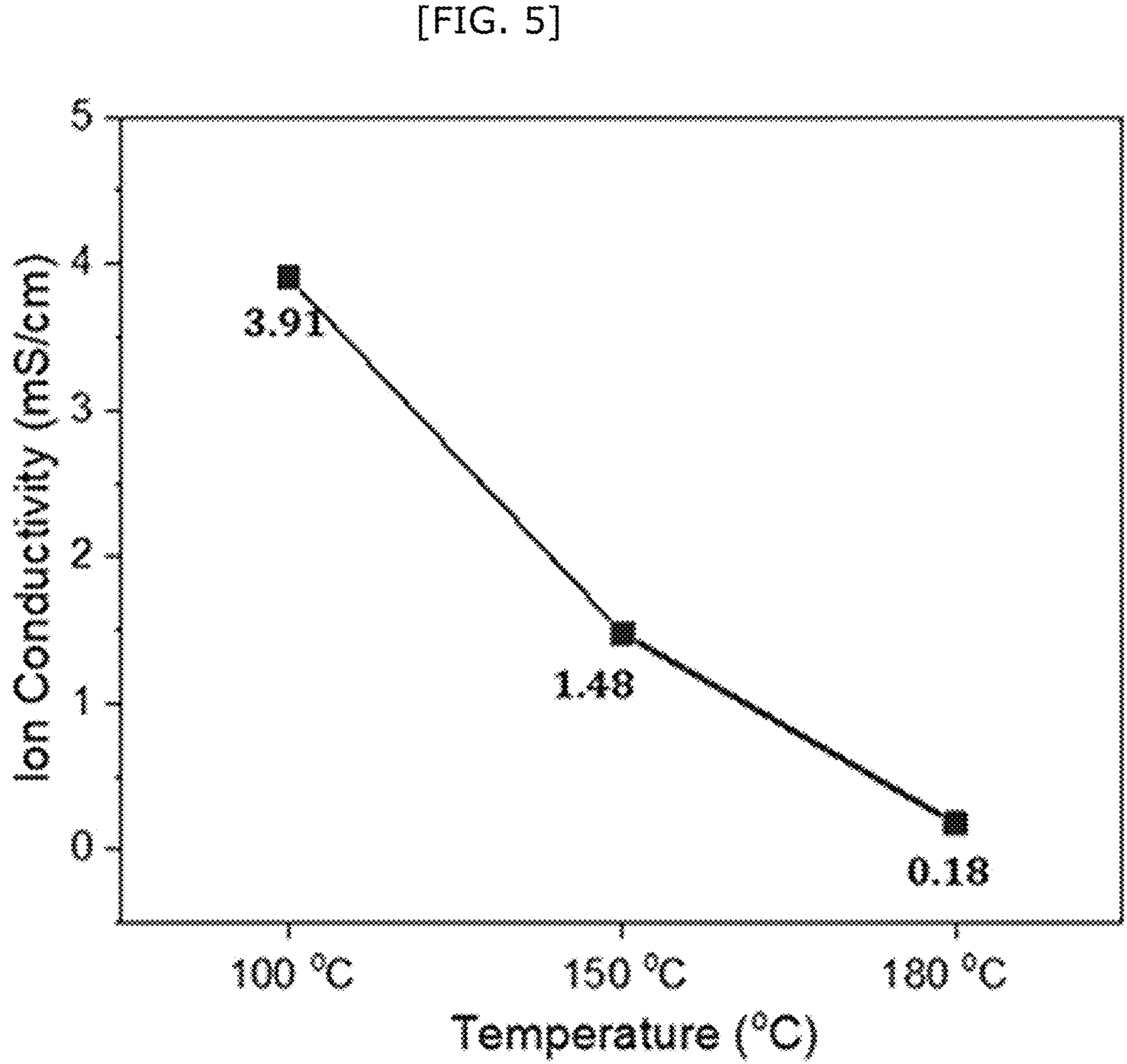

HIGH TEMPERATURE POLYMER ELECTROLYTE MEMBRANE FUEL CELL AND METHOD FOR MANUFACTURING SAME

CROSS-REFERENCE TO RELATED APPLICATIONS

This application claims the benefit of Korean Patent Application No. 10-2022-0152360, filed on Nov. 15, 2022, which application is hereby incorporated herein by reference.

TECHNICAL FIELD

The present disclosure relates to a high temperature polymer electrolyte membrane fuel cell and a method for manufacturing the same.

BACKGROUND

High temperature polymer electrolyte membrane fuel cells have a driving temperature of about 120° C. to 200° C.

Since the high temperature polymer electrolyte membrane fuel cells have a high driving temperature, an electrolyte membrane capable of being operated even under non-humidified conditions is required.

Currently, a commercial electrolyte membrane for a high temperature polymer electrolyte membrane fuel cell is a phosphoric acid-polybenzimidazole (PA-PBI) electrolyte membrane, and in the commercial electrolyte membrane, hydrogen ions are conducted by phosphoric acid.

The PA-PBI electrolyte membrane may be used at 140° C. to 180° C., but a phosphoric acid outflow problem occurs at a temperature of about 140° C. or less, and due to this, hydrogen ion conductivity is lowered to deteriorate cell performance.

SUMMARY

The present disclosure relates to a high temperature polymer electrolyte membrane fuel cell and a method for manufacturing the same. Particular embodiments relate to a high temperature polymer electrolyte membrane fuel cell including a phosphoric acid-doped polymer of intrinsic microporosity and a method for manufacturing the same.

An embodiment of the present disclosure provide an electrolyte membrane capable of being driven in a wide temperature range and a high temperature polymer electrolyte membrane fuel cell including the same.

Another embodiment of the present disclosure provides an electrolyte membrane having improved hydrogen ion conductivity at high temperatures and a high temperature polymer electrolyte membrane fuel cell including the same.

Still another embodiment of the present disclosure provides an electrolyte membrane in which phosphoric acid outflow is suppressed and a high temperature polymer electrolyte membrane fuel cell including the same.

The embodiment of the present disclosure are not limited to the embodiments mentioned above. The embodiments of the present disclosure will become more apparent from the following description, and will be realized by means and combinations thereof described in the claims.

A high temperature polymer electrolyte membrane fuel cell according to one embodiment of the present disclosure may include an electrolyte membrane, a cathode disposed on one surface of the electrolyte membrane, and an anode disposed on the other surface of the electrolyte membrane, wherein the electrolyte membrane may include a phosphoric acid-doped polymer of intrinsic microporosity (PIM).

The phosphoric acid-doped polymers of intrinsic microporosity may be represented by Chemical Formula 1 below.

Chemical Formula 1

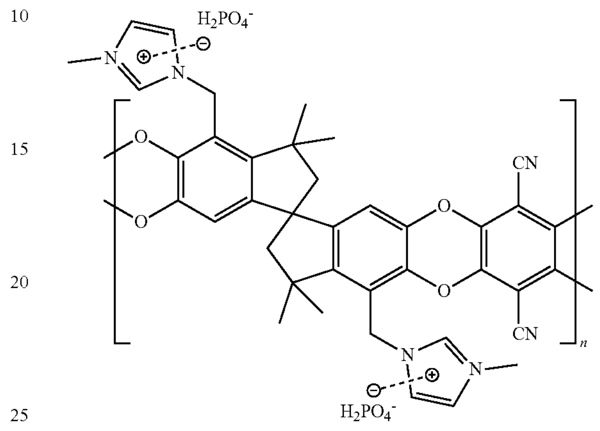

In Chemical Formula 1, n may be a number from 10 to 30, and a dotted line may represent the electrostatic attraction between cations and anions. All ranges provided herein are inclusive, e.g., n can be 10 or 30 or anything in between.

The electrolyte membrane may have a thickness of 30 μm to 100 μm.

A method for manufacturing a high temperature polymer electrolyte membrane fuel cell according to one embodiment of the present disclosure may include steps of preparing a solution including a first precursor represented by Chemical Formula 1a below, applying the solution onto a substrate to form a first film, impregnating the first film with an aqueous sodium hydroxide (NaOH) solution to obtain a second film including a second precursor in which bromine ions of the first precursor are substituted with hydroxide ions, impregnating the second film with phosphoric acid to obtain an electrolyte membrane including a phosphoric acid-doped polymer of intrinsic microporosity (PIM), and forming a cathode on one surface of the electrolyte membrane and forming an anode on the other surface of the electrolyte membrane.

Chemical Formula 1a

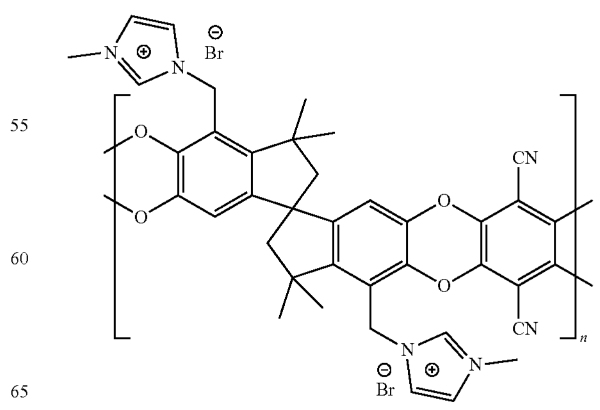

In Chemical Formula 1a, n may be a number from 10 to 30.

The second precursor may include a compound represented by Chemical Formula 1b below.

Chemical Formula 1b

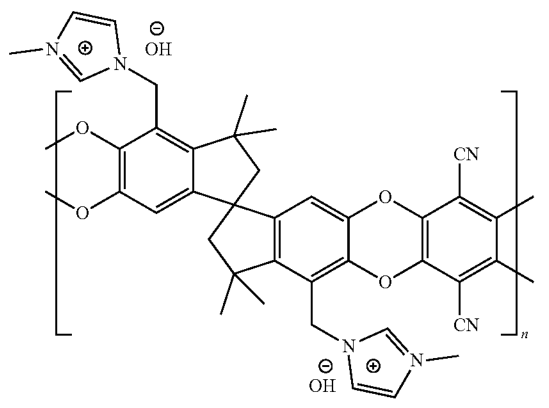

In Chemical Formula 1b, n may be a number from 10 to 30.

According to embodiments of the present disclosure, it is possible to obtain an electrolyte membrane capable of being driven in a wide temperature range and a high temperature polymer electrolyte membrane fuel cell including the same.

According to embodiments of the present disclosure, it is possible to obtain an electrolyte membrane having improved hydrogen ion conductivity at high temperatures and a high temperature polymer electrolyte membrane fuel cell including the same.

According to embodiments of the present disclosure, it is possible to obtain an electrolyte membrane in which phosphoric acid outflow is suppressed and a high temperature polymer electrolyte membrane fuel cell including the same.

The effects of embodiments of the present disclosure are not limited to the above-mentioned effects. It should be understood that the effects of embodiments of the present disclosure include all effects that can be inferred from the following description.

BRIEF DESCRIPTION OF THE DRAWINGS

FIG. 1 shows a high temperature polymer electrolyte membrane fuel cell according to embodiments of the present disclosure.

FIG. 2 shows the surface of a first film.

FIG. 3 shows an electrolyte membrane according to embodiments of the present disclosure.

FIG. 4 shows hydrogen ion conductivity of the electrolyte membrane according to a Preparation Example.

FIG. 5 shows hydrogen ion conductivity of the electrolyte membrane according to a Comparative Preparation Example.

DETAILED DESCRIPTION OF ILLUSTRATIVE EMBODIMENTS

The above and other features and advantages of embodiments of the present disclosure will be easily understood through the following preferred embodiments related to the accompanying drawings. However, the present disclosure is not limited to the embodiments described herein and may be embodied in other forms. Rather, the embodiments introduced herein are provided so that the disclosed content may become thorough and complete, and the spirit of the present disclosure may be sufficiently conveyed to those skilled in the art.

Similar reference numerals are used for similar elements while explaining each drawing. In the accompanying drawings, the dimensions of the structures are illustrated after being enlarged rather than the actual dimensions for clarity of the present disclosure. Terms such as first, second, etc. may be used to describe various components, but the components should not be limited by the terms. The terms are used only for the purpose of distinguishing one component from another component. For example, a first component may be referred to as a second component, and similarly, the second component may also be referred to as the first component, without departing from the scope of rights of the present disclosure. The singular expression includes the plural expression unless the context clearly dictates otherwise.

In the present specification, terms such as "comprise", "have", etc. are intended to designate that a feature, number, step, operation, component, part, or a combination thereof described in the specification exists, but it should be understood that the terms do not preclude the possibility of the existence or addition of one or more other features, numbers, steps, operations, components, parts, or combinations thereof. Further, when a part of a layer, film, region, plate, etc. is said to be "on" another part, this includes not only the case where it is "directly on" the other part, but also the case where there is another part in the middle therebetween. Conversely, when a part of a layer, film, region, plate, etc. is said to be "under" another part, this includes not only the case where it is "directly under" the other part, but also the case where there is another part in the middle therebetween.

Unless otherwise specified, since all numbers, values, and/or expressions expressing quantities of components, reaction conditions, polymer compositions and formulations used in embodiments of the present specification are approximate values reflecting various uncertainties of the measurement that arise in obtaining these values among others in which these numbers are essentially different, they should be understood as being modified by the term "about" in all cases. Further, when a numerical range is disclosed in this description, such a range is continuous, and includes all values from a minimum value of such a range to the maximum value including a maximum value, unless otherwise indicated. Furthermore, when such a range refers to an integer, all integers including from the minimum value to the maximum value including a maximum value are included, unless otherwise indicated.

FIG. 1 shows a high temperature polymer electrolyte membrane fuel cell according to embodiments of the present disclosure. The high temperature polymer electrolyte membrane fuel cell 1 may include an electrolyte membrane 10, a cathode 20 disposed on one surface of the electrolyte membrane 10, and an anode 30 disposed on the other surface of the electrolyte membrane 10.

The electrolyte membrane 10 may include a phosphoric acid-doped polymer of intrinsic microporosity represented by Chemical Formula 1 below.

Chemical Formula 1

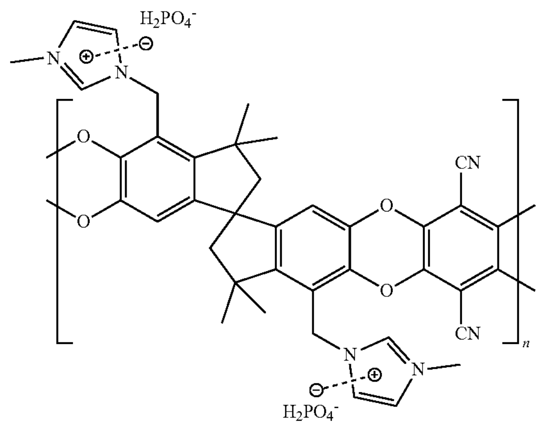

In Chemical Formula 1, n may be a number from 10 to 30, and a dotted line may represent the electrostatic attraction between cations and anions.

The electrolyte membrane 10 may include the phosphoric acid-doped polymer of intrinsic microporosity in an amount of 50 to 99% by weight, 60 to 90% by weight, or 70 to 90% by weight. Additives such as a binder, a filler, and the like may be contained in the remaining amount.

The electrolyte membrane 10 may have a thickness of 30 μm to 100 μm.

The method for manufacturing a high temperature polymer electrolyte membrane fuel cell may include steps of preparing a solution including a first precursor represented by Chemical Formula 1a below, applying the solution onto a substrate to form a first film, impregnating the first film with an aqueous sodium hydroxide (NaOH) solution to obtain a second film containing a second precursor in which bromine ions of the first precursor are substituted with hydroxide ions, impregnating the second film with phosphoric acid to obtain an electrolyte membrane including a phosphoric acid-doped polymer of intrinsic microporosity (PIM), and forming a cathode on one surface of the electrolyte membrane and forming an anode on the other surface of the electrolyte membrane.

Chemical Formula 1a

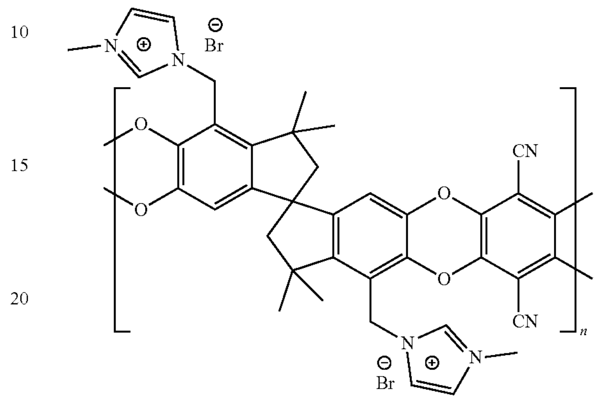

In Chemical Formula 1a, n may be a number from 10 to 30.

A method of preparing the first precursor is not particularly limited. For example, as shown in Reaction Formula 1 below, a compound named M-PIM is synthesized through a nucleophilic aromatic substitution reaction between tetrahydroxy hexamethylspirobisindane and tetrafluorophthalonitrile, and Br-PIM is synthesized through selective bromination at the methyl site of the toluene structure in the M-PIM. A first precursor including an ionic structure may be synthesized through a nucleophilic substitution reaction between the synthesized Br-PIM and various types of tertiary amines. In Reaction Formula 1 below, imidazolium was used as a tertiary amine.

Reaction Formula 1

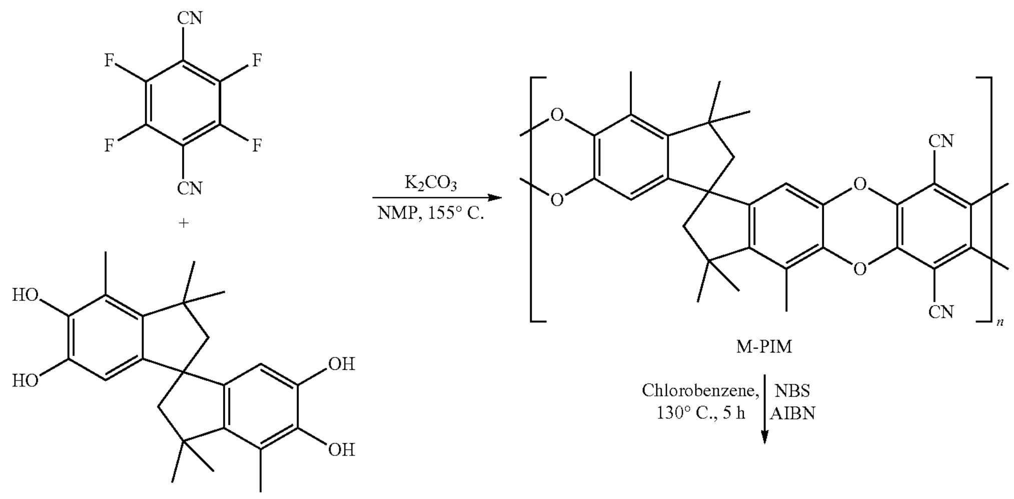

-continued

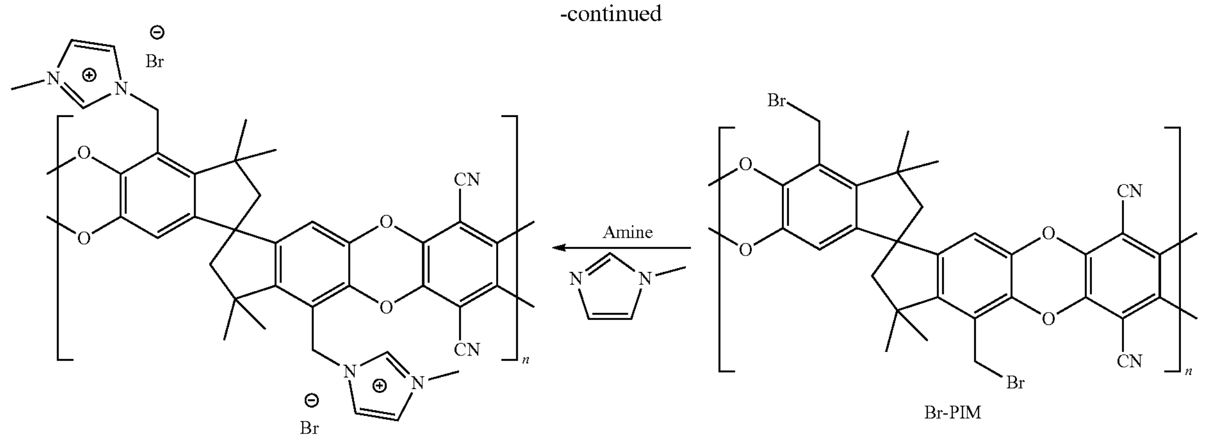

In embodiments of the present disclosure, the first film is prepared by forming a solution including the first precursor into a film before substituting bromine ions of the first precursor with hydroxide ions. When a solution including the second precursor is formed into a film after preparing a second precursor by substituting the bromine ions of the first precursor with the hydroxide ions, the chain structure is released during phosphoric acid impregnation thereafter so that physical properties such as stiffness and the like and chemical stability of the electrolyte membrane may be lowered. As in embodiments of the present disclosure, when the solution including the first precursor is first formed into a film, and then the bromine ions of the first precursor are substituted with the hydroxide ions and impregnated with phosphoric acid, a dissolution phenomenon of the electrolyte membrane does not occur, and the physical and chemical influences applied to the electrolyte membrane are remarkably reduced.

A method for manufacturing a high temperature polymer electrolyte membrane fuel cell according to embodiments of the present disclosure will be described in more detail through Preparation Examples below.

Preparation Example

A first film was prepared by casting a solution obtained by dissolving the first precursor prepared as in Reaction Formula 1 above in dimethylformamide (DMF), a solvent, to have a concentration of 2% (w/v) on a glass plate. At this time, polyvinylidene fluoride (PVDF) as a binder for film formation was dissolved in the solution in an amount of about 2% by weight, and then cast on a glass plate.

The solvent is not particularly limited as long as it can dissolve reactants and products well, and for example, in addition to dimethylformamide (DMF), N,N'-dimethylacetamide (DMAc), dimethyl sulfoxide (DMSO), N-methyl pyrrolidone (NMP), etc. may also be used.

The casting may be carried out by a conventional method, and it is preferable to perform the casting so that the first film has a thickness of several tens of μm to several hundreds of μm. The first film was dried to remove residual solvent. The drying was performed for 24 hours after slowly raising the temperature from room temperature to 60° C. FIG. 2 shows a surface of the first film.

The first film was impregnated in 500 ml of a 0.1 M aqueous sodium hydroxide (NaOH) solution at room temperature for about 6 hours to obtain a second film containing a second precursor represented by Chemical Formula 1b below in which bromine ions of the first precursor are substituted with hydroxide ions. When the bromine ions of the first precursor are substituted with the hydroxide ions, physical and chemical stabilities of the film are improved.

Chemical Formula 1b

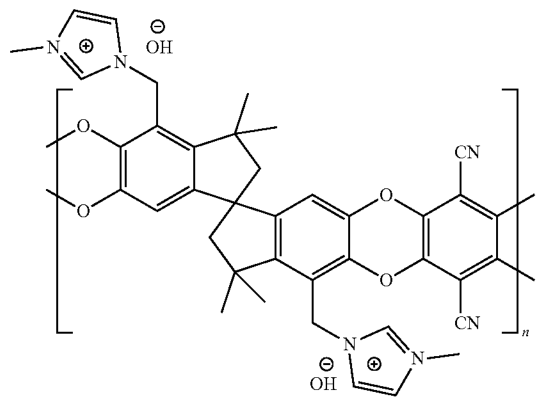

In Chemical Formula 1b, n is a number from 10 to 30.

The second film was washed with distilled water until the pH of the second film became neutral.

The second film was impregnated with 30 mL of a phosphoric acid solution, and then treated in an oven at about 80° C. for about 3 hours to obtain an electrolyte membrane containing phosphoric acid-doped polymers of intrinsic microporosity.

FIG. 3 shows an electrolyte membrane according to embodiments of the present disclosure.

The thicknesses of the first film, the second film, and the electrolyte membrane are shown in Table 1 below.

TABLE 1

| Classification | Thickness [μm] |
|---|---|
| First film | 54 |
| Second film | 54 |
| Electrolyte membrane | 67 |

After impregnation with phosphoric acid, the electrolyte membrane expanded by about 15% to 20% in the thickness direction and about 10% in the plane direction. This may be said to be due to a reason that the permeability level of phosphoric acid was changed while the structure of the electrolyte membrane was maintained.

Comparative Preparation Example

An electrolyte membrane was prepared in the same manner as in the Preparation Example except that the first film was immediately impregnated with a phosphoric acid solution without being impregnated with an aqueous sodium hydroxide solution.

Experimental Example

Hydrogen ion conductivities of the electrolyte membranes according to the Preparation Example and the Comparative Preparation Example were measured.

After removing phosphoric acid remaining on the surface of each electrolyte membrane, the hydrogen ion conductivity was measured for each temperature condition of 100° C., 150° C., and 180° C. in a non-humidified environment.

After cutting each electrolyte membrane to fit the size of a jig, impedance was measured by the dipole method based on the AC impedance measurement method for temperatures of 100° C., 150° C., and 180° C. using impedance measuring equipment, and hydrogen ion conductivity was evaluated according to the Equation below.

$$\sigma = L/RS \quad \text{Equation}$$

In the Equation, σ is a hydrogen ion conductivity (S/cm), R is a resistance (Ω), L is a distance (cm) between electrodes, and S is an effective surface area ($cm^2$) through which current flows.

FIG. 4 shows hydrogen ion conductivity of the electrolyte membrane according to the Preparation Example. FIG. 5 shows hydrogen ion conductivity of the electrolyte membrane according to the Comparative Preparation Example. The Comparative Preparation Example has very low hydrogen ion conductivity, and as it goes to high temperatures, the hydrogen ion conductivity decreases. Meanwhile, the Preparation Example shows a hydrogen ion conductivity of about 20 times or more compared to the Comparative Preparation Example, and the hydrogen ion conductivity increases as it goes to high temperatures.

The changes in thickness before and after measuring the hydrogen ion conductivity of the electrolyte membrane according to the Preparation Example are shown in Table 2 below.

TABLE 2

| Measurement temperature | Thickness [μm] before measuring hydrogen ion conductivity | Thickness [μm] after measuring hydrogen ion conductivity |
|---|---|---|
| 100° C. | 50 | 48 |
| 150° C. | 56 | 52 |
| 180° C. | 55 | 54 |

In the Preparation Example, the state of the membrane after measuring the hydrogen ion conductivity at high temperatures does not change. This means that there is no outflow phenomenon of the impregnated phosphoric acid.

Hereinabove, embodiments of the present disclosure have been described, but those of ordinary skill in the art to which the present disclosure pertains will understand that the present disclosure may be implemented in other specific forms without changing the technical spirit or essential features thereof. Therefore, it should be understood that the embodiments described above are illustrative in all respects and not restrictive.

What is claimed is:

1. A fuel cell comprising a high temperature polymer electrolyte membrane, the fuel cell comprising:
   - an electrolyte membrane comprising a phosphoric acid-doped polymer of intrinsic microporosity;
   - a cathode disposed on a first surface of the electrolyte membrane; and
   - an anode disposed on a second surface of the electrolyte membrane, the second surface opposite the first surface.

2. The fuel cell of claim 1, wherein the phosphoric acid-doped polymer of intrinsic microporosity is represented by

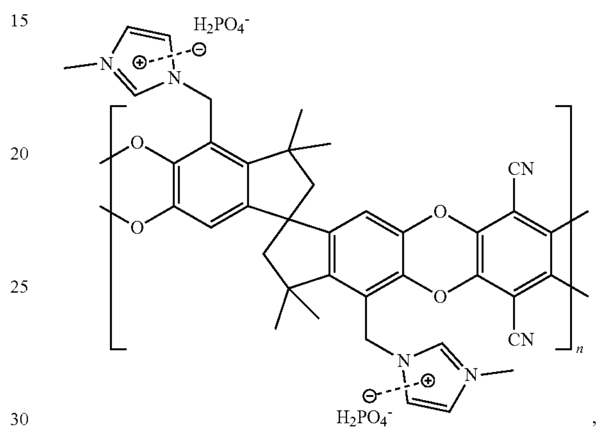

, wherein n is a number from 10 to 30, and a dotted line represents an electrostatic attraction between cations and anions.

3. The fuel cell of claim 2, wherein the electrolyte membrane has a thickness of 30 μm to 100 μm.

4. The fuel cell of claim 1, wherein the electrolyte membrane has a thickness of 30 μm to 100 μm.

5. A method for manufacturing a fuel cell comprising a high temperature polymer electrolyte membrane, wherein the fuel cell comprises an electrolyte membrane comprising a phosphoric acid-doped polymer of intrinsic microporosity, a cathode disposed on a first surface of the electrolyte membrane, and an anode disposed on a second surface of the electrolyte membrane, the second surface opposite the first surface, the method comprising:
   - preparing a solution comprising a first precursor represented by

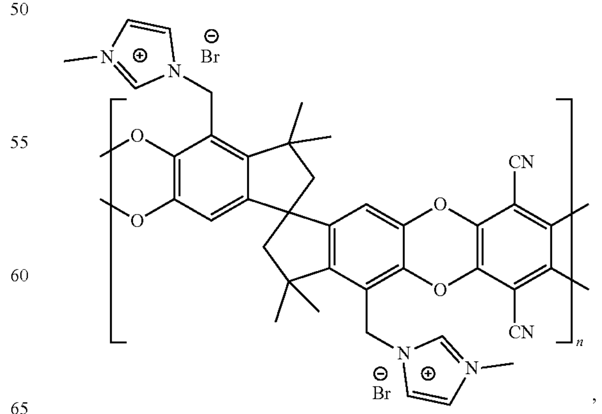

, wherein n is a number from 10 to 30;

applying the solution onto a substrate to form a first film;

impregnating the first film with an aqueous sodium hydroxide (NaOH) solution to obtain a second film comprising a second precursor in which bromine ions of the first precursor are substituted with hydroxide ions; and impregnating the second film with phosphoric acid to obtain the electrolyte membrane.

6. The method of claim 5, further comprising:

forming the cathode on the first surface of the electrolyte membrane; and forming the anode on the second surface of the electrolyte membrane.

7. The method of claim 5, wherein the second precursor comprises a compound represented by

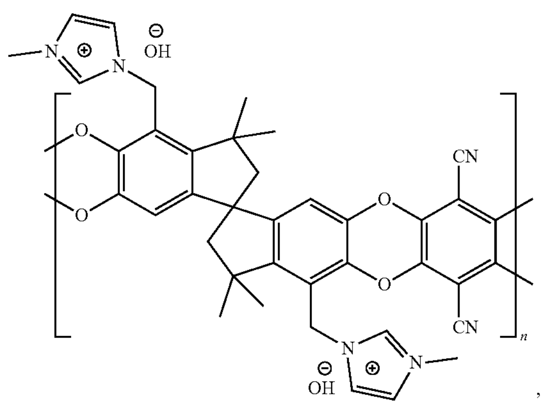

wherein n is a number from 10 to 30.

8. The method of claim 5, wherein the phosphoric acid-doped polymer of intrinsic microporosity is represented by

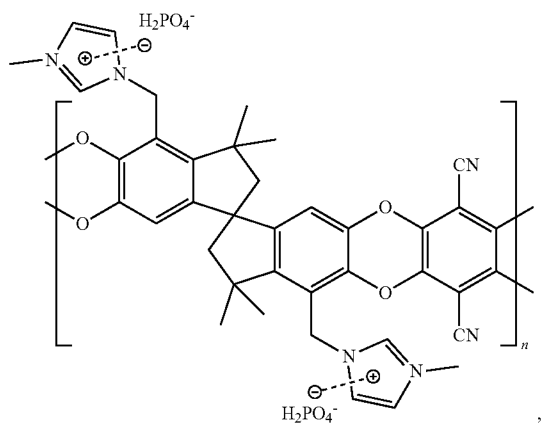

wherein n is a number from 10 to 30 and a dotted line represents an electrostatic attraction between cations and anions.

9. The method of claim 5, wherein the electrolyte membrane has a thickness of 30 μm to 100 μm.

10. The method of claim 6, wherein the electrolyte membrane has a thickness of 30 μm to 100 μm.

11. The method of claim 7, wherein the electrolyte membrane has a thickness of 30 μm to 100 μm.

12. The method of claim 8, wherein the electrolyte membrane has a thickness of 30 μm to 100 μm.

* * * * *